(12) United States Patent
Shuster et al.

(10) Patent No.: US 10,007,334 B2
(45) Date of Patent: Jun. 26, 2018

(54) SYSTEM, METHOD AND APPARATUS OF SIMULATING PHYSICS IN A VIRTUAL ENVIRONMENT

(71) Applicant: UTHERVERSE DIGITAL INC., Vancouver (CA)

(72) Inventors: Brian Shuster, Vancouver (CA); Aaron Burch, Vancouver (CA)

(73) Assignee: Utherverse Digital Inc., Vancouver (CA)

( * ) Notice: Subject to any disclaimer, the term of this patent is extended or adjusted under 35 U.S.C. 154(b) by 109 days.

(21) Appl. No.: 14/937,741

(22) Filed: Nov. 10, 2015

(65) Prior Publication Data

US 2016/0140752 A1    May 19, 2016

Related U.S. Application Data

(60) Provisional application No. 62/079,210, filed on Nov. 13, 2014.

(51) Int. Cl.
*G06F 3/01* (2006.01)
*G06T 19/00* (2011.01)

(52) U.S. Cl.
CPC ............ *G06F 3/011* (2013.01); *G06T 19/006* (2013.01)

(58) Field of Classification Search
CPC .................................................. G06T 19/006
USPC .................................................. 345/418, 419
See application file for complete search history.

(56) References Cited

U.S. PATENT DOCUMENTS

| | | | | |
|---|---|---|---|---|
| 6,028,593 | A * | 2/2000 | Rosenberg | A63F 13/285 345/156 |
| 2007/0078735 | A1* | 4/2007 | Wan | G06Q 10/087 705/28 |
| 2010/0030531 | A1* | 2/2010 | Merlhiot | B25J 9/1666 703/2 |
| 2013/0044106 | A1* | 2/2013 | Shuster | G06T 19/20 345/419 |
| 2014/0194211 | A1* | 7/2014 | Chimes | A63F 13/497 463/43 |

\* cited by examiner

*Primary Examiner* — Jacinta M Crawford
(74) *Attorney, Agent, or Firm* — Borden Ladner Gervais LLP; Geoffrey Dekleine

(57) ABSTRACT

A method of simulating physics in a virtual worlds system includes selecting at least one of the client devices participating in an instance of a scene as a physics host, the physics host determining subsequent states of objects and sending the subsequent states to one or more processors of a server, the subsequent states of objects comprising one or more of: subsequent locations, orientations, velocities and accelerations determined based on characteristics of the objects and constraints for simulating physics consistent with the new instance of the scene of the virtual worlds system.

20 Claims, 5 Drawing Sheets

SYSTEM, METHOD AND APPARATUS OF SIMULATING PHYSICS IN A VIRTUAL ENVIRONMENT

FIELD

The present disclosure relates to virtual computer-generated environments through which users are able to navigate.

BACKGROUND

Computer generated virtual environments are increasingly popular methods for people, both real and automated, to interact within a networked system. Various on-line environments are known in which a three-dimensional, 2.5-dimensional or two-dimensional physical world (actual or fantasy) is simulated. Environments of this type are sometimes referred to as "virtual reality" or "virtual reality universe" (VRU) environments. In known VRU environments, an actual or fantasy universe is simulated within a computer memory. Multiple players may participate in the environment through a computer network, such as a local area network or a wide area network. Each player is typically represented by an "avatar," which may comprise a figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated objects, or avatars operated by other players.

In order for the VRU to provide a realistic user experience, objects including avatars within the VRU may be programmed to move as though they are subject to physics consistent with the VRU environment. The inclusion of gravity, wind and collisions between objects, for example, may enhance a user experience. Simulating physics in a VRU environment uses a significant amount of processing resources, therefore, systems and methods that efficiently manage processing demands are sought.

SUMMARY

In an aspect of the present disclosure there is provided, a method of simulating physics in a virtual worlds system, the method comprising: instantiating, using one or more processors of a server, a new instance of a scene, the new instance being defined by data stored in memory, one or more client devices displaying and participating in the new instance, at least one of the one or more client devices being selected as a physics host; receiving, at the one or more processors, a move object communication from the one or more client devices, the move object communication requesting a change to one or both of: a location and an orientation of an object; in response to the move object communication, the physics host determining a subsequent state of the object and sending the subsequent state to the one or more processors, the subsequent state comprising one or more of: a subsequent location of the object, a subsequent orientation of the object, a subsequent velocity of the object and a subsequent acceleration of the object, the subsequent state being determined based on characteristics of the object and constraints for simulating physics consistent with the new instance of the scene of the virtual worlds system; retrieving, at the one or more client devices, the subsequent state of the object and updating a display at the one or more client devices to display the subsequent state of the object.

In another aspect of the present disclosure there is provided a virtual worlds system for simulating physics, comprising: one or more servers instantiating a new instance of a scene using one or more processors of the one or more servers, the one or more servers configured to receive a move object communication associated with an object of the new instance or associated with a new object to be spawned in the new instance and receive a subsequent state of the object or new object from a physics host, the physics host configured to determine the subsequent state based on characteristics of the object and constraints for simulating physics consistent with the new instance of the scene of the virtual worlds system, the subsequent state of the object or new object comprising one or more of: a subsequent location, a subsequent orientation, a subsequent velocity and a subsequent acceleration; and one or more client devices in communication with the one or more servers, the one or more client devices participating in the new instance, one of the one or more client devices configured to send the move object communication and ones of the one or more client devices comprising displays configured to update their respective displays in response to receipt of the subsequent state; wherein at least one of the one or more client devices is the physics host.

In yet another aspect of the present disclosure there is provided an apparatus for simulating physics in a virtual worlds system, comprising: a physics host; one or more processors of a server system for instantiating a new instance of a scene and for communicating with one or more client devices participating in the new instance, the server system in communication with the physics host and the one or more processors configured to receive a move object communication associated with an object of the new instance or associated with a new object to be spawned in the new instance and receive a subsequent state of the object or new object from the physics host, the physics host configured to determine the subsequent state based on characteristics of the object or new object and constraints for simulating physics consistent with the new instance of the scene of the virtual worlds system, the subsequent state of the object or new object comprising one or more of: a subsequent location, a subsequent orientation, a subsequent velocity and a subsequent acceleration; and memory of the server system for storing the subsequent state of the object or new object; wherein the physics host is one of the one or more client devices participating in the new instance.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
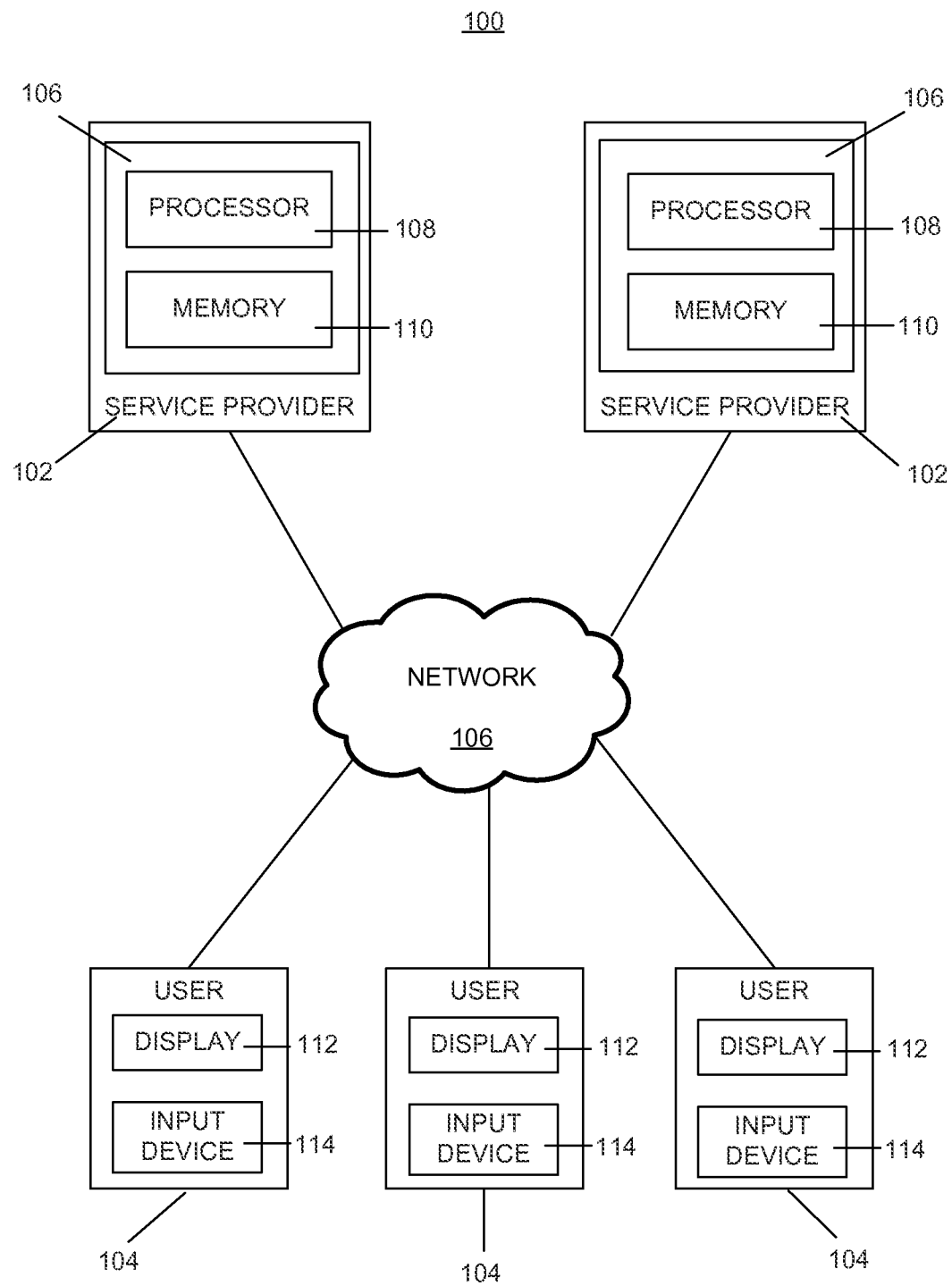
FIG. 1 is a block diagram of an example computer network system connecting virtual worlds service providers and users.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Referring to FIG. 1, a computer network system 100 connects virtual world service providers 102 with users 104 via a network 106. The computer network system 100 is capable of rendering a VRU environment and managing changes to the VRU environment resulting from user participation in the VRU environment. Examples of virtual worlds software usable to render and participate in virtual worlds include Curio™ by The Virtual World Web Inc. and Second Life™.

Service providers 102 include computing devices and systems offering virtual worlds services. Service providers 102 may include computing hardware and/or software configured to perform one or more of the processes described herein. In an embodiment, multiple service providers 102 may be housed on a single computing device. Service providers 102 may also be distributed across multiple devices, as in cloud computing or distributed systems. In an embodiment, which is depicted in FIG. 1, each service provider 102 is hosted on a server 106 that includes a processor 108 and a memory 110. According to another embodiment, in order to use the computational ability of the computer network system 100 as a whole, some functions of the server(s) may be provided by the users. This distributed computing structure may allow for more powerful computational abilities, as the full computer power of all users may be utilized to provide some or all server functions to the network. In this embodiment, some or all of the users may function as both clients and servers.

Service providers 102 communicate via one or more networks 106 with users 104. The networks 106 may include, for example, Internet networks, cellular networks, local area networks, wide area networks, wireless networks, Ethernet networks, and so on, as well as combinations thereof. Users 104 may include user computing devices having user interfaces including a display 112 and an input device 114 or a touch-sensitive user interface that functions as a display and an input device, for example, such as desktop computers, laptop computers, mobile computing devices, mobile phones and tablets, for example. The term "user" throughout this specification may be used to refer to a user or client device such as the aforementioned and/or an entity, such as an individual, operating such a device, as appropriate to the context of the term.

In a virtual reality embodiment, a user interface of the client device includes a head-mounted, or immersive, display. Examples of such displays include Occulus Rift™ by Occulus VR Inc. and Morpheus™ by Sony Computer Entertainment Inc. In the virtual reality embodiment, the user input may be received through other client device components, such as a controller, a joystick, a gesture input device such as a hand gesture input device, for example, a haptics device, or a motion detection device such as Leap Motion™, for example, a microphone or other input device, for example. Additional devices and systems may be included in the system of FIG. 1. For example, service providers 102 may communicate with common data stores, such as account databases, registration or authentication servers and management servers, for example. Such use of centralized systems may allow service providers 102 to easily synchronize and coordinate among each other, for example, to coordinate avatar location transitions, to synchronize user accounts, and so on.

Figure 2:
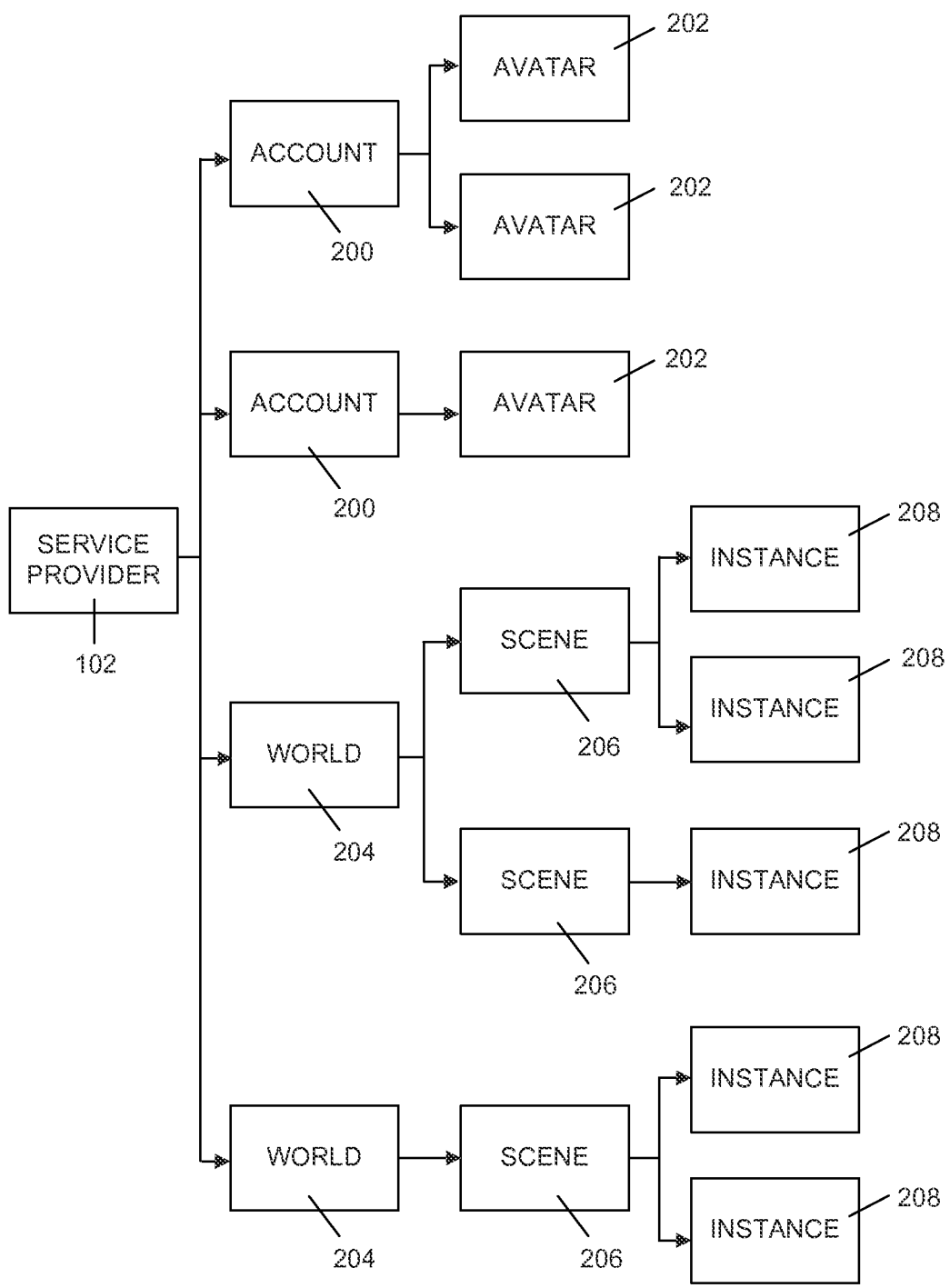
FIG. 2 is a block diagram showing an example arrangement of virtual worlds data on a service provider, as used in an embodiment.

FIG. 2 shows an example arrangement of virtual worlds data, as used in an embodiment. The blocks represent types of data objects, and interconnections may represent relationships among the data elements, such as pointers, references, subclass relationships, or the like. Data structures may be stored on computer-readable media of the server system 102, for example, such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Service provider 102 may be represented as a data object with general data relating to the service provider. The service provider 102 may maintain accounts 200 for users of the service provider. The account objects 200 may include relevant data relating to users, such as usernames, authentication information, attribute information, personal information, and so on. Each account may further be associated with one or more avatars 202, which the user may select for appearing in a virtual world. The service provider 102 may allow users to maintain multiple avatars, may restrict users to a single avatar or may allow users to navigate through a VRU as observers with no avatar, in various embodiments. When allowing users 104 to maintain multiple avatars, a service provider 102 may allow users to take on different appearances and personas in different situations, as selected by the users 104 and/or the service provider 102.

The service provider 102 may further maintain worlds 204. Each world 204 may represent a virtual space in which avatars may interact. The service provider 102 may maintain multiple virtual worlds 204, and each virtual world 204 may be operated by different users 104 or administrators of service provider 102.

Virtual worlds 204 may in turn include scenes 206. Scenes 206 represent virtual locations where users may visit and enter. A scene 206 may be defined by various attributes such as appearance, size, furniture, included items, architecture and so on. Scripts may also be included as part of the scene 206. Scripts are generally software based instructions that, when executed, result in changes to the scene 206. Scripts may be executed in response to user actions, may be executed at specified times, or may be executed in response to trigger events. For example, curtains covering a stage may be opened in response to an avatar pulling a cord, may be opened when a concert start time is reached or may be opened when the capacity of the concert venue reaches a predetermined size.

In some situations, it may be desirable to have a single scene 200 available but have avatars enter different copies of that scene. Such copies are implemented by instances 208.

An instance 208 represents a running version of a scene, and users 104 interact within instances 208 of scenes 206. In an embodiment, the computer network system 100 includes one or more servers in communication with the service providers 102 to operate as instance hosts that run the instances 208. The service provider 102 may use rules specified for a particular scene 206 in order to determine when to create a new instance. For example, one may create a scene arranged to appear like a virtual tennis court, and it may be desirable for pairs of tennis players to be provided distinct copies of the scene rather than making all players use the same virtual space. So, a new instance would be initiated each time a pair of tennis players enters the virtual tennis court and instances that are currently running have reached capacity.

New instances may also be created based on time intervals, avatar user requests, availability of objects within each instance, and so on. In one embodiment, an environment may automatically change, or the avatars may be automatically transported, when a threshold event takes place. For example, avatars waiting to play poker may be automatically transported to the poker room when eight avatars have signed up for the table. In another example, a prospective tennis player may wait in a waiting room until another tennis player arrives and the waiting room is transformed into a tennis court.

Instances may originally be configured based on the specification of the underlying scene. For example, a newly created instance may be arranged to have the same contained items, the same appearance, the same size, the same scripts and so on, with respect to the scene. In alternate embodiments, the scene may include instructions that randomize or otherwise alter the nature of each new instance. As users interact with an instance of a scene, those avatars may cause changes to the contained items, appearance, and so on. Such changes may or may not be reflected back to the original scene, to other copies of the scene or other instances of the scene, possibly depending on the configuration of the scene. Additionally, in an embodiment, new instances may be based on existing instances, rather than being based on the original scenes.

Within a service provider, worlds 204, scenes 206, and instances 208 may be represented as data structure objects, such as document objects, for example. The document objects are encoded in a descriptive language and define respective 3-D, 2.5-D or 2-D modeled objects or spaces. Service providers may include software to convert these objects to graphical or other representations. The software may be operated on the service provider to generate those representations. Additionally or alternately, client software operating on user devices may perform the translation of data structure objects to graphical representations.

In order for one or more users 104 to interact in a virtual world, the system 100 instantiates, in memory at one or more servers 106, an instance of a scene defined by a collection of document objects. The service provider 102, or another system component, controls contents of the collection of document objects in response to signals received at one or more processors from one or more client devices of the users 104. The service provider 102, or another system component, receives, at one or more processors, data requesting changes to an instance of a scene including at least location and orientation of objects modeled in the scene. The term "objects" generally includes all items and avatars that are present in an instance of a scene. Boundaries, such as walls, for example, may also be referred to as objects. Data representing the changes is then provided to the one or more users so that an event playing out in an instance of a scene may be experienced in substantially real time by users 104.

In order for movement of objects in the instance of the scene to appear realistic, calculations are performed to simulate physical conditions consistent with the virtual world on the objects. Physical conditions may be simulated by spawning objects and determining paths for objects through an instance of a scene that avoid other objects, applying gravitational and drag forces, applying frictional forces, determining collisions between objects and accounting for elasticity of contacting surfaces when collisions occur between objects. For example, when an object is dropped in an instance of a scene, physics calculations determine if the object hits the floor or if the object hits another object that supported by the floor, such as a table, for example. Physics calculations further determine how fast the falling object falls, the direction of the falling path and if the falling object bounces when it hits the floor or table.

Different types of virtual worlds may subject the objects thereof to different types of physical conditions, and therefore, different types of physics calculations may be performed. Examples of types of virtual worlds in which objects may be subject to different physical conditions include: earth world, underwater world and outer space world, for example. Other worlds having the same or different associated physics calculations are also possible.

Prior to, or when, a new instance of a scene is instantiated, a "physics host" for performing calculations for the virtual world system 100 is determined. The physics host may alternatively be determined in response to a need for physics calculations. A single client device may be the physics host or more than one client device may be the physics host. Although all client devices may be capable of determining subsequent states of moved objects, the physics host is the client device(s) that is selected by the server 106. Criteria for determining which client device(s) the server 106 will use as a physics host include: latency of data transmission from the client(s), processing availability of client devices or trusted status of the client(s), for example. Further, different client devices may be the physics host for different types of physics calculations or successive physics calculations. In order to select the physics host, the server 106 sends a request to one or more potential physics hosts and the selection(s) is confirmed using a handshake communication between the server 106 and the one or more physics hosts. The physics host is then granted a higher level of access to the collection of document objects at the server 106 than other client devices, which allows the physics host to update content of the collection of document objects with respect to physics calculations.

Figure 3:
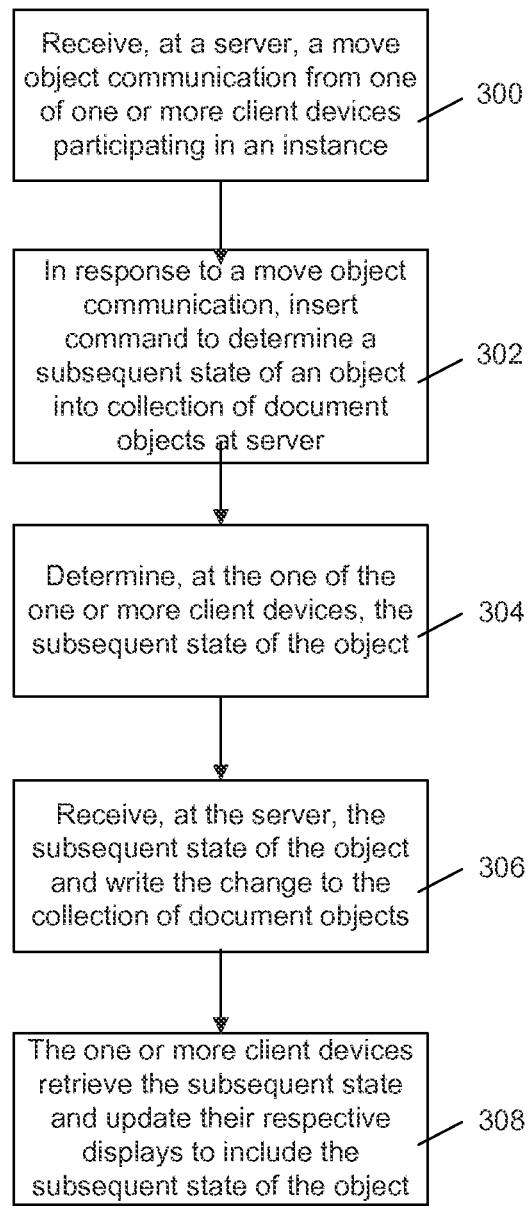
FIG. 3 is a flow chart depicting a method of simulating physics in a virtual worlds system.

Referring to FIG. 3, a method of simulating physics in a virtual worlds system is shown. Following instantiation of a new instance of a scene at a server 106 in which one or more client devices participate, a move object communication is received 300 at one or more processors 108 of the server from one of the one or more client devices participating in the instance. In response to the move object communication, a move object command is inserted 302 into the collection of document objects. The move object communication may be generated in response to a user input, such as pressing a button or selecting from a drop-down menu, for example, in response to a time being reached or in response to trigger events, such as capacity of an instance reaching a threshold, for example.

The move object communication includes a movement type such as object projectile, drop object, path object and spin object, for example. Depending on the movement type, the communication may further include one or more of: a velocity to indicate speed and direction of object movement, an acceleration to indicate rate of change of object velocity, a jerk to indicate rate of change of object acceleration and an end location of an object to be moved along a path. A subsequent state is then determined by the physics host. The subsequent state of the object includes one or more of: a subsequent location of the object, a subsequent orientation of the object, a subsequent velocity of the object, a subsequent acceleration of the object and a subsequent jerk of the object. The server 102 receives 306 the subsequent state of the object from the physics host and writes the change to the collection of document objects. The one or more client devices participating in the instance then update 308 their respective displays with the subsequent state of the object.

In one embodiment, the client device that operates as the physics host does not include a user interface. In this embodiment, the client device is not operable as an observer in a virtual world nor is the client device able to instantiate an avatar in the VRU.

The subsequent states are sent from the physics host at regular intervals until the object on which the physics calculations are being performed comes to a rest. For example, the regular intervals may be three times per second. Other longer or shorter intervals are also possible.

The subsequent state of the object is determined based on characteristics of the object and constraints for simulating virtual world consistent physics. The characteristics are linked to the object as one or more child nodes, for example, and include frictional coefficients of object surfaces, degree of elasticity of object surfaces and object mass, for example. Constraints include boundaries present in the instance of the scene and gravitational or other forces to be applied. For example, in an underwater world buoyancy and drag due to water may be applied and in an outer space world, gravitational forces may be omitted. Software for applying physics to computer generated objects is known in the art. Software applications such as NVIDIA® PhysX® Physics by Unity Technologies or Havok Physics™ by Havok™, for example, may be used.

A spawn object command causes an object previously not present in the instance of the scene to be displayed. New objects may be spawned in response to a user input, such as pressing a button or selecting from a drop-down menu, for example, in response to a time being reached or in response to trigger events, such as capacity of an instance reaching a threshold, for example. Newly spawned objects are subject to physics upon being spawned in the instance of the scene. The spawn object command may include a move object child node accompanied by a movement type so that when the new object appears in the instance of the scene, the new object's behavior is consistent with the physical conditions of the virtual world. For example, a ball that is spawned in mid-air will fall to the floor, furniture that is spawned will be placed in an empty spot on the floor and avatars that are spawned will not land on top of other objects in the instance of the scene unless further commands are provided to do so.

It will be appreciated by persons skilled in the art that any number of movement types may be possible and that in addition to being linked to objects, a movement type may be linked to a volume in an instance of a scene that may or may not include objects. In addition, the movement types may be customized based on the type of virtual world. For example, in a tennis match virtual world, multiple object projectile commands may be included to simulate overhead serves, volleys and baseline shots. Further, the different movement types may be associated with different types of tennis rackets or degrees of wear on the tennis balls at different points in the match, for example.

The subsequent state of the object may further include a subsequent shape or a subsequent form. A subsequent shape may be included to depict the elasticity of an object. For example, a bouncing ball may deform and appear more oblong in shape when it collides with an object, such as a wall, for example. A subsequent form may be included when the object changes position in response to movement. For example, a dish may break into several pieces in response to falling and hitting the floor when the impact occurs above a threshold velocity. In an embodiment, client devices interpolate between subsequent states received from the server 106 in order to display realistic object movement. For example, subsequent states may be sent at three times per second, which may result in a moving object appearing to snap between positions rather than moving naturally. By interpolating at the client device, intermediate positions between the subsequent states may smooth out the movement and contribute to realistic object movement. In addition to improving the quality of the user experience, interpolating between the subsequent states saved at the server 106 to provide one or more states therebetween may result in less data transmission, which may reduce the processing load on the physics host and improve overall efficiency of the system 100.

Figure 4:
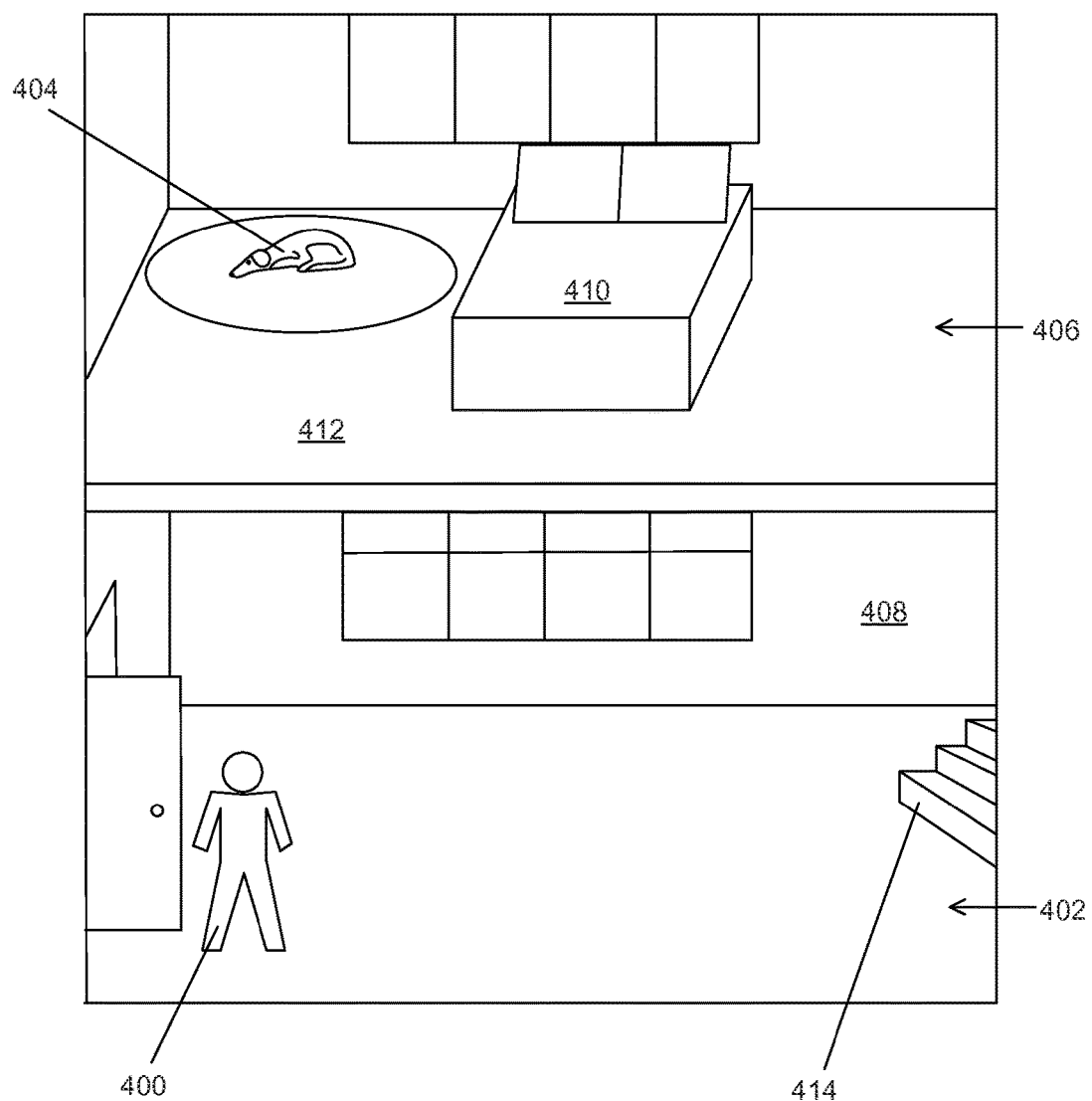
FIG. 4 is an example screen shot of a user interface at a client device depicting an instance of a scene in which the client device is participating.
Figure 5:
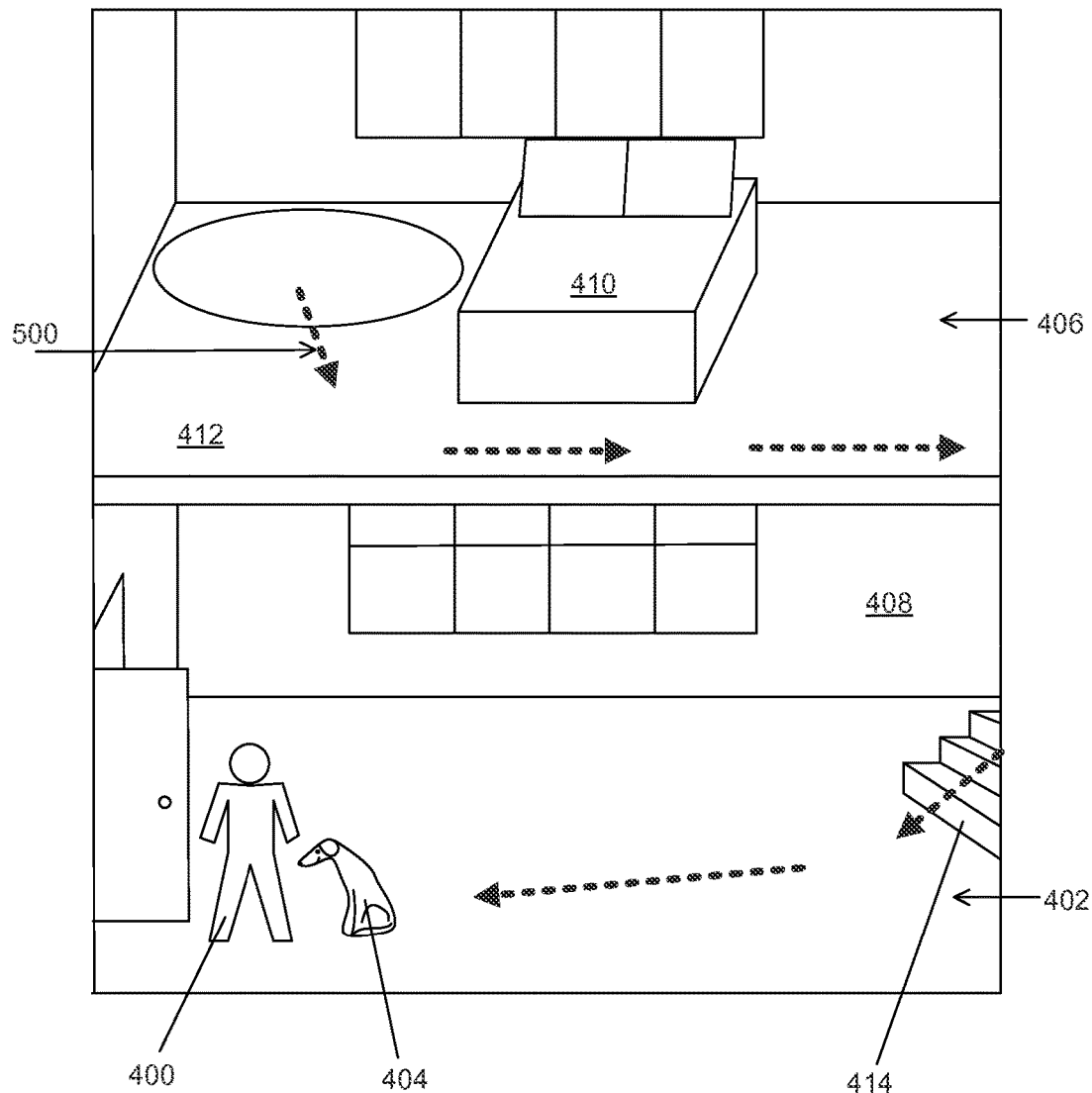
FIG. 5 is another example screen shot of a user interface at a client device depicting an instance of a scene in which the client device is participating.

Continued reference is made to FIG. 3 with additional reference to FIGS. 4 and 5 to describe one example of a method of simulating physics in a virtual worlds system. An example of an instance of a scene that has been instantiated by the service provider 102 is shown in FIGS. 4 and 5. In this example, an avatar 400 is located on a first floor 402 of a building and a dog 404 is located on a second floor 406. A move object communication having a path object movement type is received 300 at the server 106 in response to a user input at a client device indicating that the user associated with avatar 400 would like to call the dog 404. The server then inserts 302 a move object command into the content of the collection of document objects to determine a subsequent location and form of the dog 404 to the physics host. The command includes identification of the object, which is the dog 404 and the end location and form for the dog 404, which is beside the avatar 400 in a sitting position. The physics host determines 304 subsequent locations and forms of the dog 404 by determining a path 500. The path 500 avoids collisions with other objects in the scene, such as bed 410, and is constrained by boundaries, such as the walls 408, the floor 412 and the stairs 414. The dog 404 takes different forms when rising from a lying down position, walking across the floor 412, walking down the stairs 414 and sitting. The physics host sends the subsequent locations and forms to the server 106 at which the change is written to the collection of document objects. The client devices participating in the instance then update 308 their respective displays with the subsequent state of the object.

According to another example, in which a user participates in an archery competition, a move object communication having an object projectile movement type is received 300 at the server 106 in response to a user input to shoot an arrow. The server then inserts 302 a command to determine a subsequent location and orientation of the arrow into the collection of document objects. The command includes identification of the object, which is the arrow, and the velocity (i.e. speed and direction of travel) of the arrow. The physics host then determines 304 subsequent locations and orientations of the arrow by calculating the effect of gravitational and drag forces, which cause the arrow to decelerate as it travels along a trajectory. The subsequent locations and orientations are sent at regular intervals until the motion of the arrow is complete. The physics host sends the subsequent locations and orientations to the server 106, which receives 306 the data and writes the subsequent locations and orientations to the collection of document objects. The client devices participating in the instance of the scene retrieve the subsequent states and update their respective displays.

In a virtual reality embodiment, the user may use one or more controller components that simulate a bow and arrow in combination with a head-mounted display to participate in the instance. In this embodiment, the perspective of the user may be from behind their avatar or may be from within a head of their avatar such that the user may look down, through the head-mounted display, and view their avatar body, which includes arms holding the bow and arrow.

In an embodiment, the server 106 receives and considers subsequent states of an object from more than one client device. In this embodiment, more than one client device is a physics host. When the subsequent states of the object are received from the physics hosts, the server 106 compares the results and determines a subsequent state to write to the collection of document objects for retrieval by the client devices participating in the instance based on consensus between the physics hosts. In a further embodiment, client devices that are outliers because the subsequent states returned therefrom are consistently different from the other physics hosts may be marked as unreliable so that such client devices are not selected as physics hosts when future move object communications are received at the server 106.

Performing physics calculations uses a large amount of processing time and resources. By relying on one of the client devices to calculate physics for the system 100, efficiency is improved because the server is not burdened with storing detailed geometry of a large number of objects in memory and performing complex physics calculations. Allowing the server 106 to select the physics host from the client devices further increases efficiency because the server 106 is able to select a client device(s) that has sufficient processing availability, for example. Further, because the physics host is a client, no data is sent between the server 106 and the physics host because the physics host already has all of the information required to perform the physics calculations.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of simulating physics in a virtual worlds system, the method comprising:
    instantiating, using one or more processors of a server, a new instance of a scene, the new instance being defined by data stored in memory, one or more client devices displaying and participating in the new instance, at least one of the one or more client devices being selected as a physics host;
    receiving, at the one or more processors, a move object communication from the one or more client devices, the move object communication requesting a change to one or both of: a location and an orientation of an object;
    in response to the move object communication, the physics host determining a subsequent state of the object and sending the subsequent state to the one or more processors, the subsequent state comprising one or more of: a subsequent location of the object, a subsequent orientation of the object, a subsequent velocity of the object and a subsequent acceleration of the object, the subsequent state being determined based on characteristics of the object and constraints for simulating physics consistent with the new instance of the scene of the virtual worlds system; and
    retrieving, at the one or more client devices, the subsequent state of the object and updating a display at the one or more client devices to display the subsequent state of the object.

2. The method of claim 1, wherein the new instance is defined by a collection of document objects stored at the server and, in response to the move object communication, the server writes a command to determine the subsequent state to the collection of document objects.

3. The method of claim 2, wherein the command comprises a movement type.

4. The method of claim 3, wherein the movement type comprises one of: spawn object, object projectile, drop object, path object and spin object.

5. The method of claim 3, wherein the command comprises one or more of: a velocity, an acceleration, a jerk and an end location of an object for which a path is to be determined.

6. The method of claim 1, wherein the characteristics and constraints are stored in memory at the physics host.

7. The method of claim 1, wherein the characteristics and constraints are stored linked to the object as one or more child nodes.

8. The method of claim 1, wherein the physics host comprises no user interface.

9. The method of claim 1, wherein the physics host comprises a user interface enabling the physics host to participate in the new instance as an observer or by instantiating an avatar representing the physics host.

10. The method of claim 1, wherein characteristics comprise one or more of: frictional coefficients of object surfaces, degree of elasticity of object surfaces and object mass.

11. The method of claim 1, wherein the subsequent state of the object is determined based on a path from a starting location to an end location that avoids collisions with objects in the instance.

12. The method of claim 1, comprising determining using interpolation, at the one or more client devices, a state of the object between the subsequent state of the object and a later subsequent state of the object.

13. The method of claim 1, wherein the subsequent state of the object comprises a subsequent shape.

14. The method of claim 1, wherein the subsequent state of the object comprises a subsequent form.

15. The method of claim 1, wherein the display is head-mounted display.

16. The method of claim 1, wherein the move object communications is a child node of a newly spawned object to apply physics consistent with the virtual world to the newly spawned object.

17. A virtual worlds system for simulating physics, comprising:
    one or more servers instantiating a new instance of a scene using one or more processors of the one or more servers, the one or more servers configured to receive a move object communication associated with an object of the new instance or associated with a new object to be spawned in the new instance and receive a subsequent state of the object or new object from a physics host, the physics host configured to determine the subsequent state based on characteristics of the object and constraints for simulating physics consistent with the new instance of the scene of the virtual worlds system, the subsequent state of the object or new object comprising one or more of: a subsequent location, a subsequent orientation, a subsequent velocity and a subsequent acceleration; and one or more client devices in communication with the one or more servers, the one or more client devices participating in the new instance, one of the one or more client devices configured to send the move object communication and ones of the one or more client devices comprising displays configured to update their respective displays in response to receipt of the subsequent state;

wherein at least one of the one or more client devices is the physics host.

18. The virtual worlds system of claim 17, wherein the new instance is defined by a collection of document objects stored at the one or more servers and, in response to the move object communication, the server writes a command to determine the subsequent state to the collection of document objects.

19. The virtual worlds system of claim 17, wherein the physics host comprises no user interface.

20. An apparatus for simulating physics in a virtual worlds system, comprising:

a physics host;

one or more processors of a server system for instantiating a new instance of a scene and for communicating with one or more client devices participating in the new instance, the server system in communication with the physics host and the one or more processors configured to receive a move object communication associated with an object of the new instance or associated with a new object to be spawned in the new instance and receive a subsequent state of the object or new object from the physics host, the physics host configured to determine the subsequent state based on characteristics of the object or new object and constraints for simulating physics consistent with the new instance of the scene of the virtual worlds system, the subsequent state of the object or new object comprising one or more of: a subsequent location, a subsequent orientation, a subsequent velocity and a subsequent acceleration; and memory of the server system for storing the subsequent state of the object or new object;

wherein the physics host is one of the one or more client devices participating in the new instance.

* * * * *